(12) United States Patent
Sharif

(10) Patent No.: US 10,246,046 B2
(45) Date of Patent: Apr. 2, 2019

(54) VEHICLE SEATBELT ASSEMBLY

(71) Applicant: Nissan North America, Inc., Franklin, TN (US)

(72) Inventor: Curtis Sharif, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 75 days.

(21) Appl. No.: 15/621,834

(22) Filed: Jun. 13, 2017

(65) Prior Publication Data

US 2018/0354453 A1    Dec. 13, 2018

(51) Int. Cl.
| | |
|---|---|
| *B60R 22/46* | (2006.01) |
| *B60R 22/26* | (2006.01) |
| *B60R 22/02* | (2006.01) |
| *B60R 22/06* | (2006.01) |
| *B60R 22/12* | (2006.01) |
| B60R 22/00 | (2006.01) |
| B60R 22/18 | (2006.01) |

(52) U.S. Cl.
CPC ............. *B60R 22/26* (2013.01); *B60R 22/02* (2013.01); *B60R 22/06* (2013.01); *B60R 22/12* (2013.01); *B60R 22/00* (2013.01); *B60R 2022/003* (2013.01); *B60R 2022/1806* (2013.01); *B60R 2022/1812* (2013.01)

(58) Field of Classification Search
CPC ............ B60R 22/1952; B60R 22/1954; B60R 22/1951; B60R 22/1955; Y10T 24/45466; Y10T 24/45623; Y10T 24/45665

USPC .................................... 280/801.1, 805, 806
See application file for complete search history.

(56) References Cited

U.S. PATENT DOCUMENTS

| | | | |
|---|---|---|---|
| 5,313,690 A | 5/1994 | Hiramatsu et al. | |
| 6,340,176 B1 * | 1/2002 | Webber | B60R 22/1952 280/805 |
| 6,419,271 B1 * | 7/2002 | Yamada | B60R 22/1952 280/801.1 |
| 7,516,987 B2 * | 4/2009 | Koide | B60R 22/1951 280/801.1 |
| 8,550,499 B2 * | 10/2013 | Russell | B60R 22/022 280/801.2 |
| 2004/0256850 A1 * | 12/2004 | Yamaguchi | B60R 22/195 280/806 |

(Continued)

*Primary Examiner* — Toan C To
(74) *Attorney, Agent, or Firm* — Global IP Counselors, LLP

(57) ABSTRACT

A vehicle seatbelt assembly includes a first member, a second member, a buckle mechanism, and a clutch mechanism. The first member is configured to attach to one of a vehicle floor structure and a seat structure. The second member is supported on the first member. The second member is configured for limited sliding movement relative to the first member. The buckle mechanism is attached to the second member for movement therewith. The buckle mechanism has a latch device configured to releaseably retain a seatbelt latch tongue member. The clutch mechanism is disposed between the first member and the second member and is operable to switch between a dis-engaged state and an engaged state. In the dis-engaged state, the clutch mechanism allows movement of the second member relative to the first member. In the engaged state, the clutch mechanism prevents movement of the second member relative to the first member.

15 Claims, 12 Drawing Sheets

(56) References Cited

U.S. PATENT DOCUMENTS

2010/0090454 A1* 4/2010 Sugiyama ........... B60R 22/1952
                                                    280/806
2014/0021710 A1* 1/2014 Rao .................... B60R 22/1951
                                                    280/806

* cited by examiner

US 10,246,046 B2

VEHICLE SEATBELT ASSEMBLY

BACKGROUND

Field of the Invention

The present invention generally relates to a seatbelt assembly having a load limiter. More specifically, the present invention relates to a seatbelt assembly with a load limiter that allows a shoulder portion of a seatbelt to increase in length by a predetermined distance thereby reducing tension on the shoulder portion of the seatbelt in response to rapid or sudden deceleration of a vehicle.

Background Information

When a vehicle in motion undergoes rapid and/or sudden deceleration, a passenger within the vehicle responds in accordance with Newton's laws of motion such that momentum of the passenger imparts forces to a seatbelt restraining the passenger thereby transferring force to the seatbelt. The transferred force puts the seatbelt under tension.

SUMMARY

One object of the present disclosure is to provide a seatbelt assembly with a load limiter that selectively allows an increase in length of a shoulder portion of a seatbelt in response to rapid or sudden deceleration of a vehicle, thereby reducing a level of tension experience by the seatbelt.

In view of the state of the known technology, one aspect of the present disclosure is to provide a vehicle with a seatbelt assembly load limiter that includes a first member, a second member, a buckle mechanism, and a clutch mechanism. The first member is configured to attach to one of a vehicle floor structure and a seat structure. The second member is supported on the first member. The second member is configured for limited sliding movement relative to the first member. The buckle mechanism is attached to the second member for movement therewith. The buckle mechanism has a latch device configured to releaseably retain a seatbelt latch tongue member. The clutch mechanism is disposed between the first member and the second member and is operable to switch between a dis-engaged state and an engaged state. In the dis-engaged state, the clutch mechanism allows movement of the second member relative to the first member. In the engaged state, the clutch mechanism prevents movement of the second member relative to the first member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
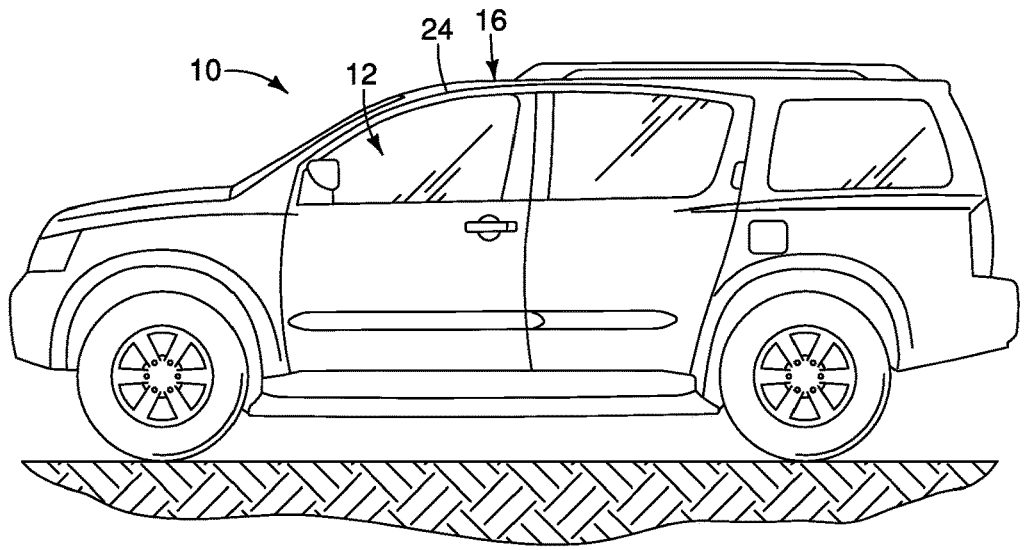
FIG. 1 is a side view of a vehicle with a passenger compartment having seatbelt assemblies in accordance with a first embodiment.
Figure 2:
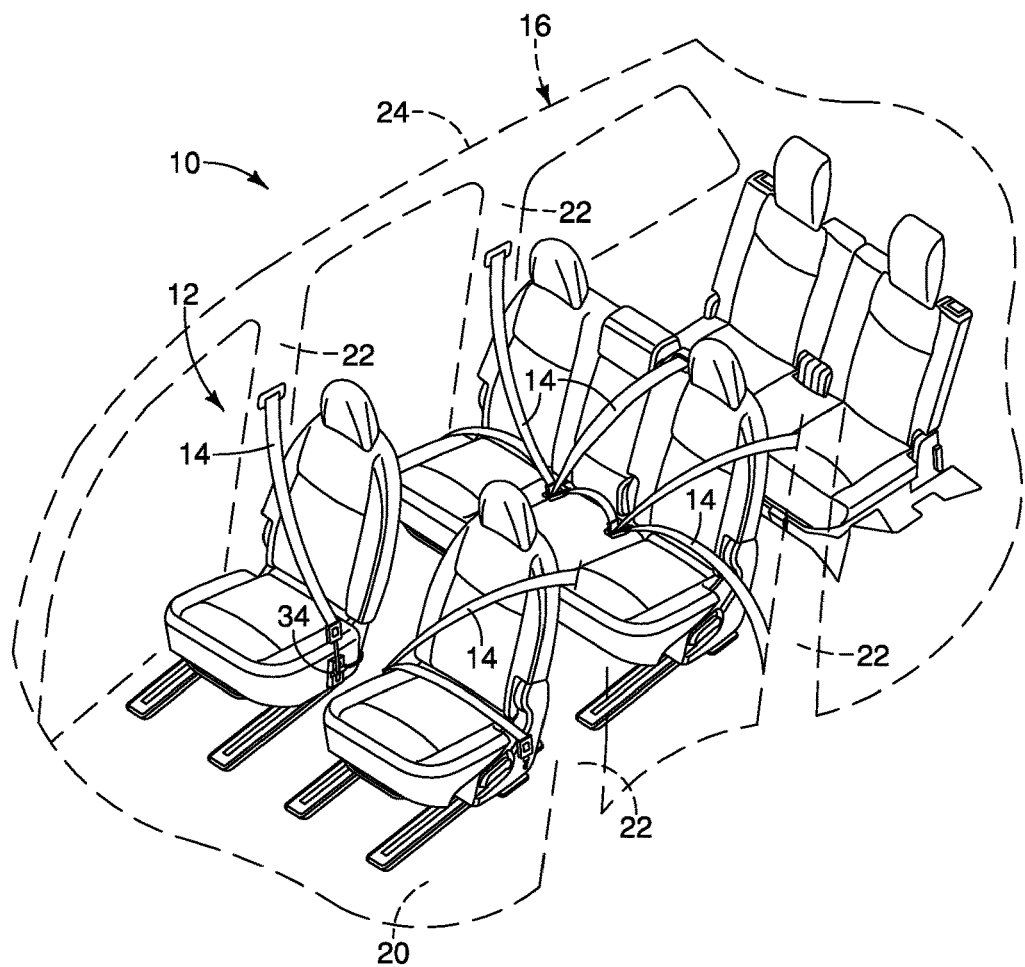
FIG. 2 is a perspective view of the passenger compartment of the vehicle depicted in FIG. 1, showing seats and seatbelt assemblies in accordance with the first embodiment.

Referring initially to FIGS. 1 and 2, a vehicle 10 with a passenger compartment 12 having a plurality of seatbelt assemblies 14 is illustrated in accordance with a first embodiment.

The vehicle 10 includes a vehicle body structure 16 that defines the passenger compartment 12. The vehicle body structure 16 includes, among other features, a floor 20, pillar structures 22 and a roof structure 24 that at least partially surround the passenger compartment 12.

A plurality of seat structures 26 are installed within the passenger compartment 12 of the vehicle 10. Each of the seat structures 26 includes at least one of the plurality of seatbelt assemblies 14.

Since each of the seatbelt assemblies 14 is basically identical, having basically the same features and structures associated therewith, only one seatbelt assembly 14 is described herein below for the sake of brevity.

Figure 3:
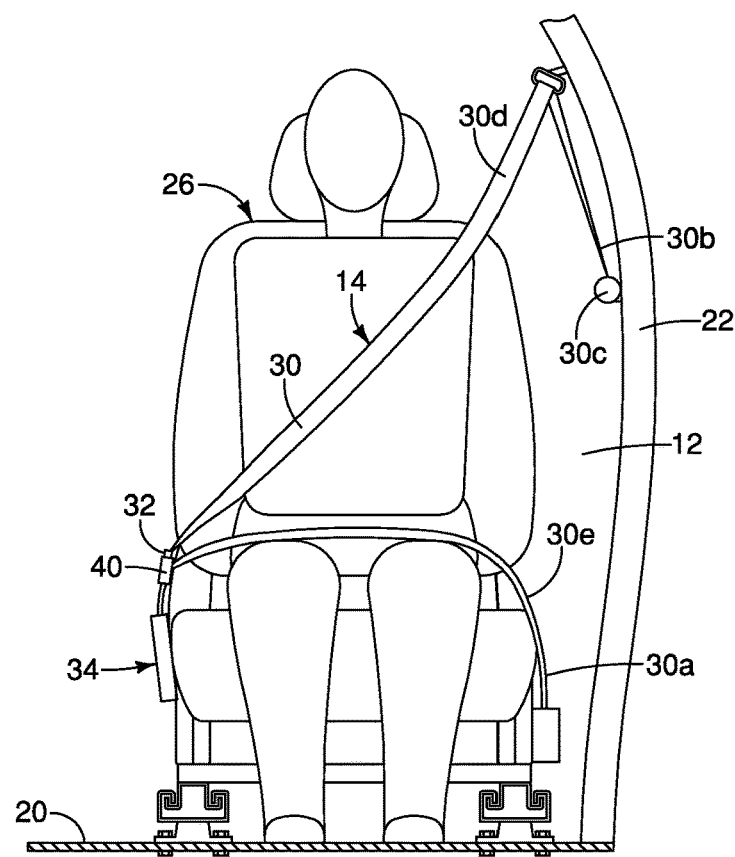
FIG. 3 is a front view of one of the seats of the vehicle depicted in FIGS. 1 and 2, showing a load limiter of the seatbelt assembly in accordance with the first embodiment.

As shown in FIG. 3, the seatbelt assembly 14 includes a seatbelt 30, a seatbelt latch tongue member 32 and a load limiter 34.

As shown in FIG. 3, the seatbelt 30 has a first end 30a non-movably fixed relative to a portion of the seat structure 26 or the floor 20, and a second end 30b retractably retained within the passenger compartment 12. For example, the second end 30b can retract into a retraction device 30c that is fixed to an adjacent one of the pillar structure 22 in a conventional manner. The seatbelt latch tongue member 32 is installed to the seatbelt 30 for sliding movement along the seatbelt 30. The seatbelt latch tongue member 32 further divides the seatbelt 30 into a shoulder portion 30d and a lap portion 30e. As shown in FIG. 3, the shoulder portion 30d extends from the seatbelt latch tongue member 32 across the torso and shoulder of a passenger seated in the seat structure 26. The lap portion 30e extends from the seatbelt latch tongue member 32 across the hip and upper thigh area of the passenger.

Figure 4:
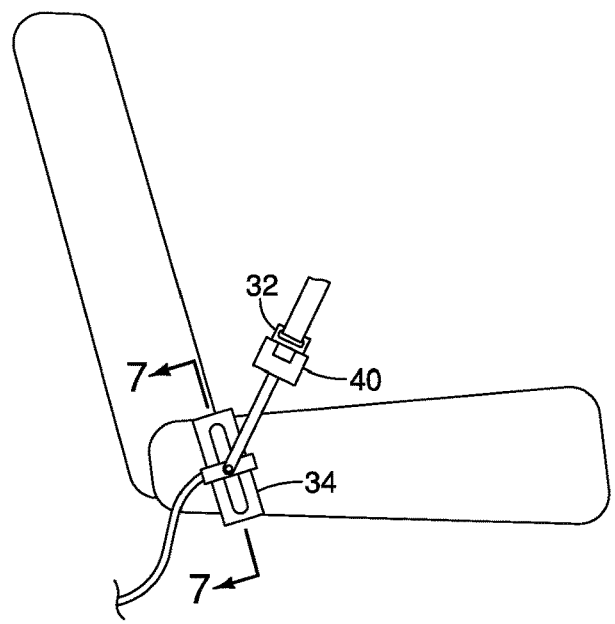
FIG. 4 is a side view of a portion of the seat depicted in FIG. 3, showing schematic details of the load limiter of the seatbelt assembly in accordance with the first embodiment.

The load limiter 34 includes a first member 36, a second member 38, a buckle mechanism 40, a clutch mechanism 40 and an electronic controller 42 (FIG. 11), and is described in greater detail below with respect to FIGS. 5-10. As shown in FIGS. 3 and 4, the first member 36 of the load limiter 34 is attached to the seat structure 26. However, the first member 36 can alternatively be attached to the floor 20 of the passenger compartment 12.

The seatbelt latch tongue member 32 is configured to releasably attach to the latch device of the buckle mechanism 40 in a conventional manner. Since seatbelts, seatbelt latch tongue members and retraction devices 30c are conventional features, further description is omitted for the sake of brevity.

A description of the load limiter 34 is now provided with specific reference to FIGS. 5-13. As mentioned above, in the first embodiment, the first member 36 is fixedly attached to the seat structure 26 in a conventional manner. The first member 36 can be non-movably fixed to the seat structure 26, or, alternatively the first member 36 can be configured to pivot relative to the seat structure 26. In the first embodiment, the first member 36 is non-movably fixed to the seat structure 26 The attachment between the seat structure 26 and the first member 36 is of sufficient strength and design to withstand forces received from the seatbelt assembly 14. For example, a bolt or pivot pin (not shown) can be installed through an aperture (not shown) in the first member 36, and extend into a metallic frame (not shown) of the seat assembly 14, where the bolt serves as a pivot axis. Since pivot attachments and metallic frames of seat assemblies are conventional structures, further description is omitted for the sake of brevity.

Figure 5:
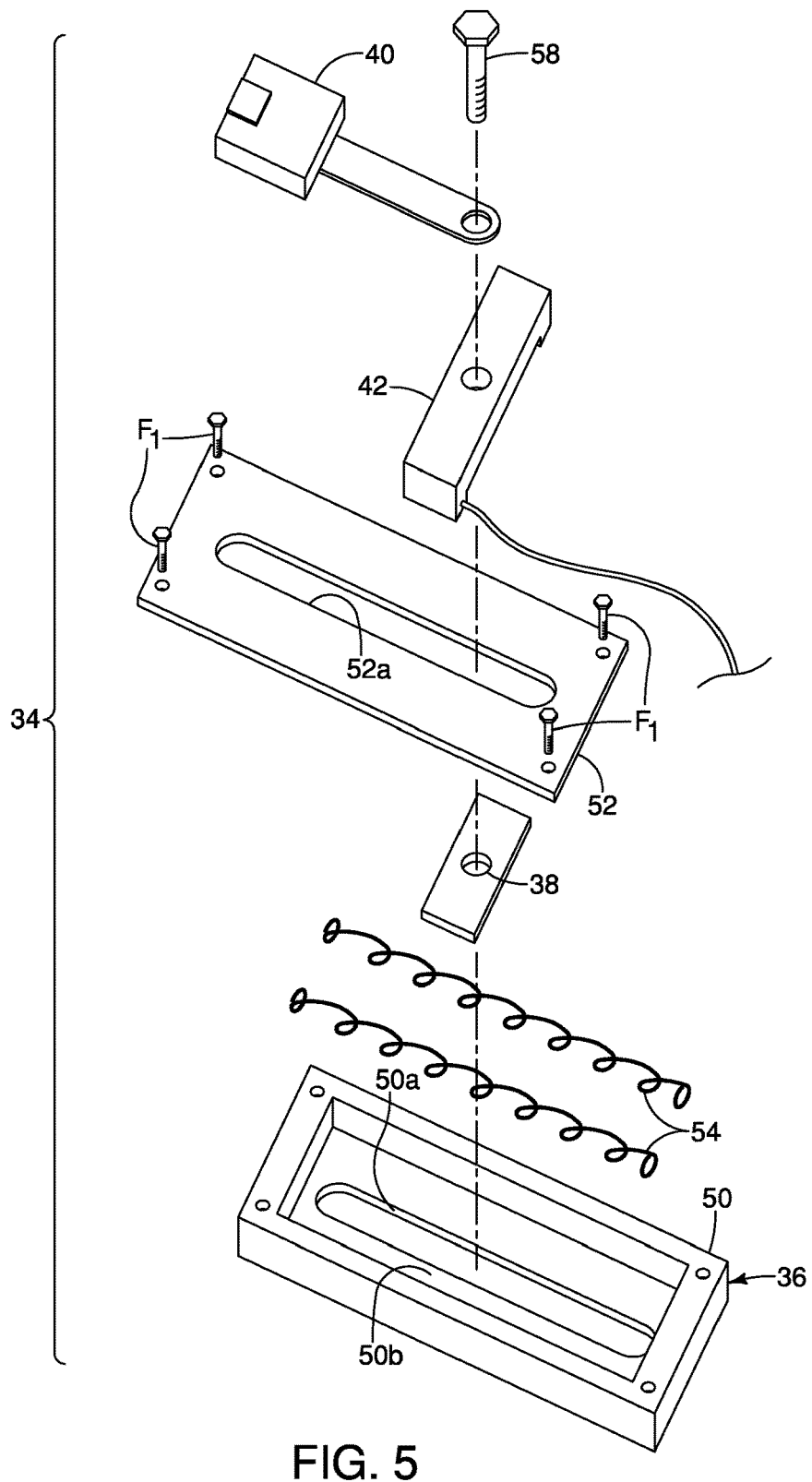
FIG. 5 is a schematic exploded perspective view of the load limiter showing details a first member, a second member, a buckle mechanism, and a clutch mechanism of the load limiter in accordance with the first embodiment.
Figure 6:
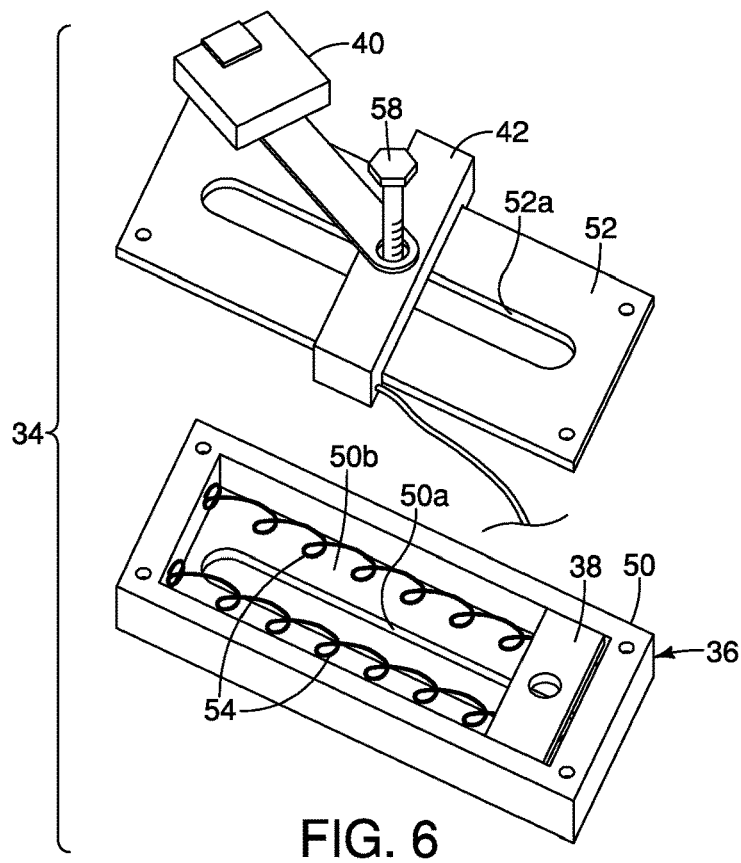
FIG. 6 is a partial exploded perspective view of the load limiter of the seatbelt assembly shown partially assembled in accordance with the first embodiment.
Figure 7:
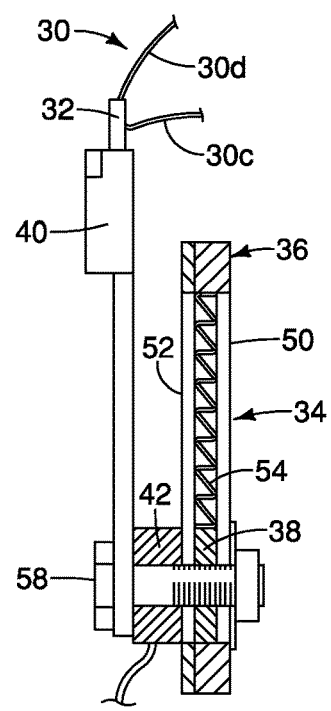
FIG. 7 is a cross-sectional view of the load limiter taken along the line 7-7 in FIG. 4 in accordance with the first embodiment.

As shown in FIGS. 5 and 6, the first member 36 includes a housing 50, a cover 52 and biasing members 54. The housing 50 and the cover 52 are provided with an elongated slots 50a and 52a that align with one another when the cover 52 is fixedly attached to the housing 50. The cover 52 can be fixed to the housing 50 via fasteners $F_1$. The housing 50 defines a recessed portion 50b that is dimensioned to receive the second member 38 and the biasing members 54. As shown in FIGS. 6 and 7, the biasing members 54 are positioned within the recessed portion 50b such that the biasing members 54 urge the second member 38 into an at rest position that is described further below.

The biasing members 54 can be metallic coil springs, pneumatic pistons, or any of a variety of conventional devices that can be used to apply a biasing force in a manner that biases the second member 54 as described herein.

The second member 38 is installed within the recessed portion 50b of the housing 50 and therefore is supported on the first member 36 such that the second member 38 is configured for limited sliding movement relative to the first member 36 within the recessed portion 50b of the housing 50 of the first member 36. Consequently, the second member 38 is dimensioned such that the second member 38 is slidable within the recessed portion 50b of the housing 50 of the first member 36.

The buckle mechanism 40 is attached to the second member 38 for movement therewith via a pivot pin 58, as shown in FIGS. 5 and 6. The pivot pin 58 is dimensioned to extend through an opening in the buckle mechanism 40, through an opening in the clutch mechanism 42, through the slot 52b of the cover 52, through an opening in the second member 38 and through the slot 50a of the housing 50 of the first member 36. The pivot pin 58 can include a threaded portion that is threadedly engages the second member 38, or and be fixed in place by a threaded nut (FIG. 7) on a back side of the first member 36. Regardless of its attachments, the pivot pin 58 is configured to allow the second member 38, the buckle mechanism 40 and the clutch mechanism 42 to slide as a single unit relative to the first member 36 and allow the buckle mechanism 40 to pivot relative to the second member 38 and the clutch mechanism 42. The pivot pin 58 further defines a coupling member that connects the buckle mechanism 40 to the second member 38.

The buckle mechanism 40 also includes a conventional latch device for connection to the seatbelt latch tongue member 32. Since latch devices in buckle mechanisms are conventional structures and mechanisms, further description is omitted for the sake of brevity.

The clutch mechanism 40 is operably disposed between the first member 36 (outside the housing 50) and the second member 38. Since the buckle mechanism 40 and the clutch mechanism 42 are attached to the second member 38 via the pivot pin 58, the buckle mechanism 40 and the clutch mechanism 42 are structurally part of the second member 38 and move therewith relative to the first member 36.

The clutch mechanism 40 is operable to switch between a dis-engaged state allowing movement of the second member 38 relative to the first member 36 and an engaged state preventing movement of the second member 38 relative to the first member 36. The clutch mechanism 42 can be any of a variety of structures and mechanisms that expand (engaged state—FIG. 9) and contract (dis-engaged state—FIG. 8) between the head of the pivot pin 58 and the housing 50. More specifically, when the clutch mechanism 42 is in an expanded state (the engaged state), the clutch mechanism 42 clamps itself between the head of the pivot pin 58 and the adjacent surfaces of the housing 50, thereby preventing movement of the clutch mechanism 42, the buckle mechanism 40 and the second member 38 relative to the housing 50 of the first member 36.

Figure 8:
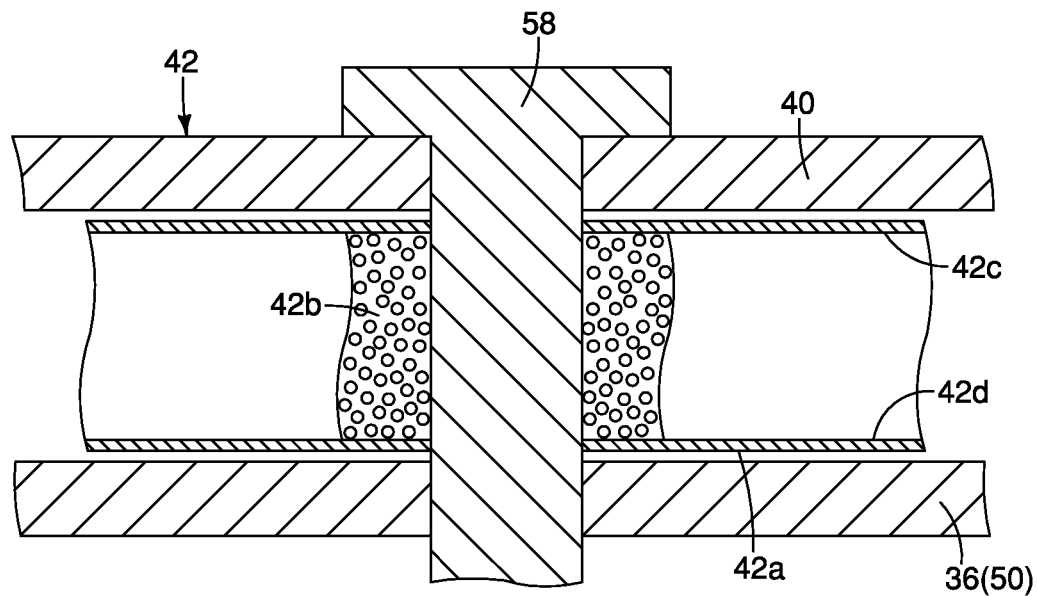
FIG. 8 is a cross-sectional view of a portion of the load limiter showing the clutch mechanism, the clutch mechanism includes a magnetorheological material in a dis-engaged state in accordance with the first embodiment.
Figure 9:
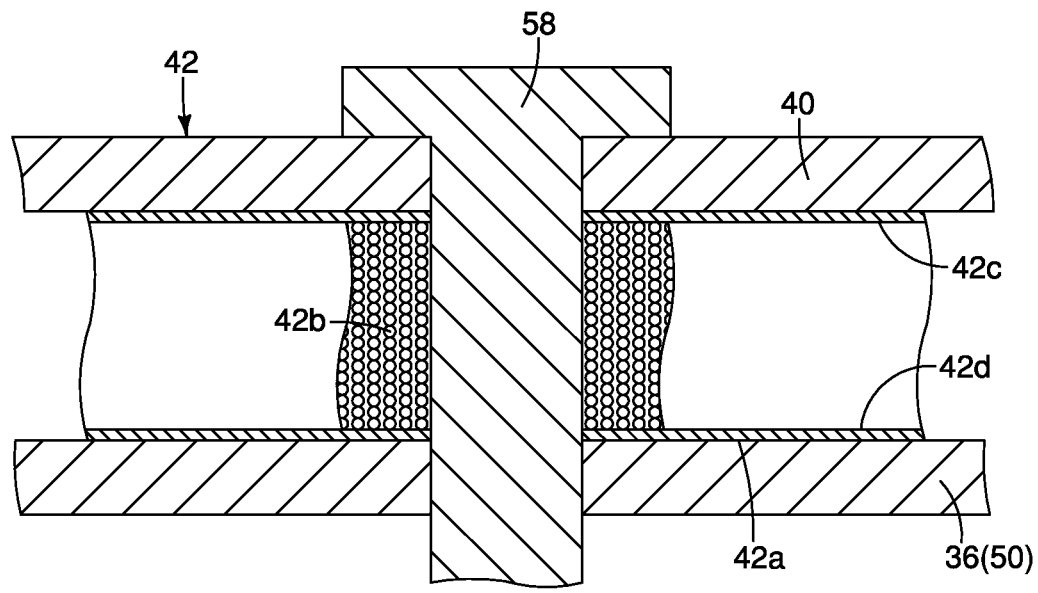
FIG. 9 is a cross-sectional view of a portion of the load limiter showing the clutch mechanism in an engaged state in accordance with the first embodiment.

In the depicted embodiments as shown in FIGS. 8 and 9, the clutch mechanism 42 includes an outer housing 42a that defines sealed chamber filled with magnetorheological liquid 42b. A first electrode 42c is located at one side of the sealed chamber and a second electrode 42d is located at an opposite side of the sealed chamber of the housing 42a. The clutch mechanism 42 is activated via application of an electric current across the first electrode 42c and the second electrode 42d. Specifically, the clutch mechanism 42 is electronically activated when the electric current is provided to flow from the first electrode 42c to the second electrode 42d. Thereafter, the clutch mechanism 42 is in the engaged state with particles in the magnetorheological liquid becoming linearly aligned causing the housing 42a to expand in directions parallel to the pivot pin 58, as shown in FIG. 9. In the absence of an electric current to the clutch mechanism 42, the clutch mechanism 42 contracts to the dis-engaged state with the magnetorheological liquid moving to more random orientations (a lack of linear alignment) that takes up less volume, as shown in FIG. 8. Since the response of magnetorheological liquid to electrical current is a conventional technology, further description is omitted for the sake of brevity.

In the first embodiment, the housing 42a can be made of any of a variety of materials that allow limited movement in response to changes in the alignment of the magnetorheological liquid disposed therein. For example, the housing 42a can be made of a plastic or polymer material, or can be made of a thin flexible metallic material or alloy.

Figure 10:
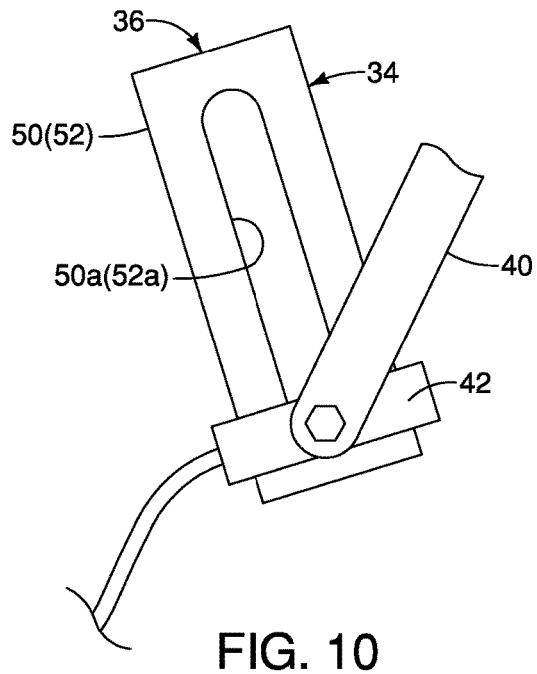
FIG. 10 is a schematic view of the seatbelt assembly showing the second member, the buckle mechanism, the buckle mechanism and the clutch mechanism in an at rest position relative to the first member in accordance with the first embodiment.
Figures 11, 12:
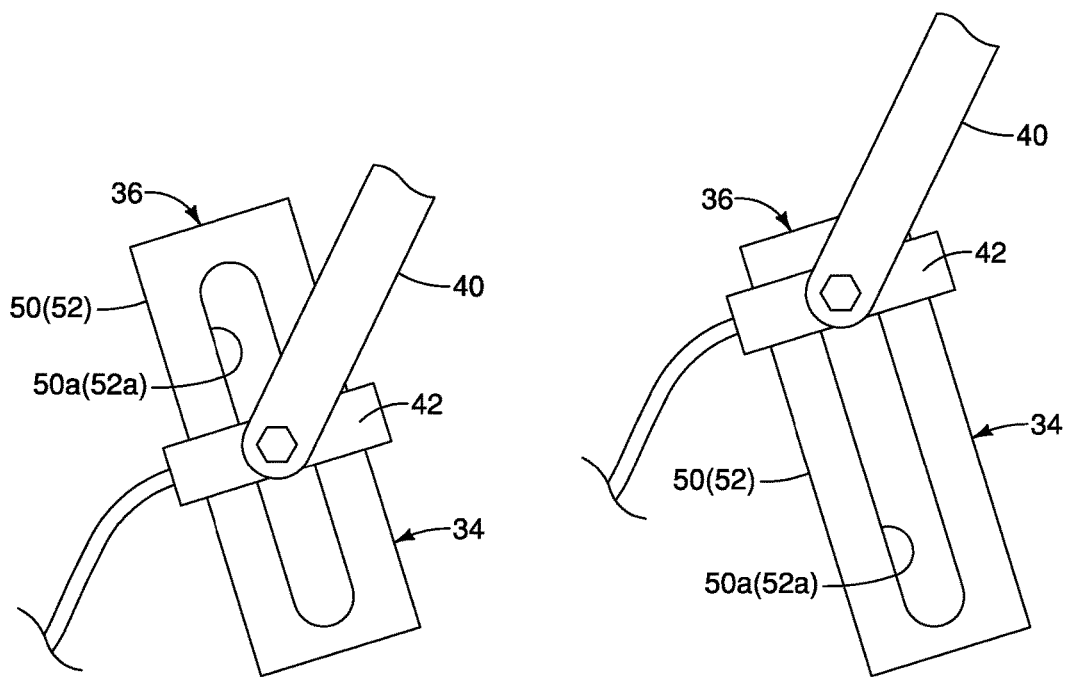
FIG. 11 is another schematic view of the portion of the seatbelt assembly showing the second member, the buckle mechanism, and the clutch mechanism of the load limiter in one of a plurality of released positions relative to the first member in accordance with the first embodiment.
FIG. 12 is still another schematic view of the portion of the seatbelt assembly showing the second member, the buckle mechanism, and the clutch mechanism in another of the plurality of released positions of the load limiter relative to the first member in accordance with the first embodiment.

As shown in FIG. 10, the second member 38 (not visible in FIG. 10), the buckle mechanism 40 and the clutch mechanism 42 are in an at rest position (a first orientation) with the second member 38 being biased by the biasing members 54 to a lower end of the recessed portion 50b of the housing 50 of the first member 36. As shown in FIG. 11, in response to a first level of tension being applied to the shoulder portion 30d of the seatbelt 30, the force of the biasing members 54 is partially overcome, allowing the second member 38 (not visible in FIG. 11), the buckle mechanism 40 and the clutch mechanism 42 to move to one of a plurality of released positions, with the clutch mechanism 42 being dis-engaged. As shown in FIG. 12, in response to a second level of tension greater than the first level of tension being applied to the shoulder portion 30d of the seatbelt 30, the force of the biasing members 54 is further overcome, allowing the second member 38 (not visible in FIG. 12), the buckle mechanism 40 and the clutch mechanism 42 to move to another of the plurality of released positions, with the clutch mechanism 42 being dis-engaged.

As is explained in greater detail below, the operation of the clutch mechanism 42 to the engaged state is usually implement with the second member 38, the buckle mechanism 40 and the clutch mechanism 42 in the at rest position shown in FIG. 10. At this time, the buckle mechanism 40 is a first distance (a predetermined distance) away from the first member 36 with the clutch mechanism 42 in the engaged state. In response to the controller 44 operating the clutch mechanism 42 to change from the engaged state to the dis-engaged state, movement of the second member 38, the buckle mechanism 40 and the clutch mechanism 42 relative to the first member 36 in response to tension on the shoulder portion 30d of the seatbelt 30 changes the location of the buckle mechanism 40 such that the buckle mechanism 40 is a second distance away from the first member 36, the second distance being greater than a first distance, as shown in FIGS. 11 and 12.

Figure 13:
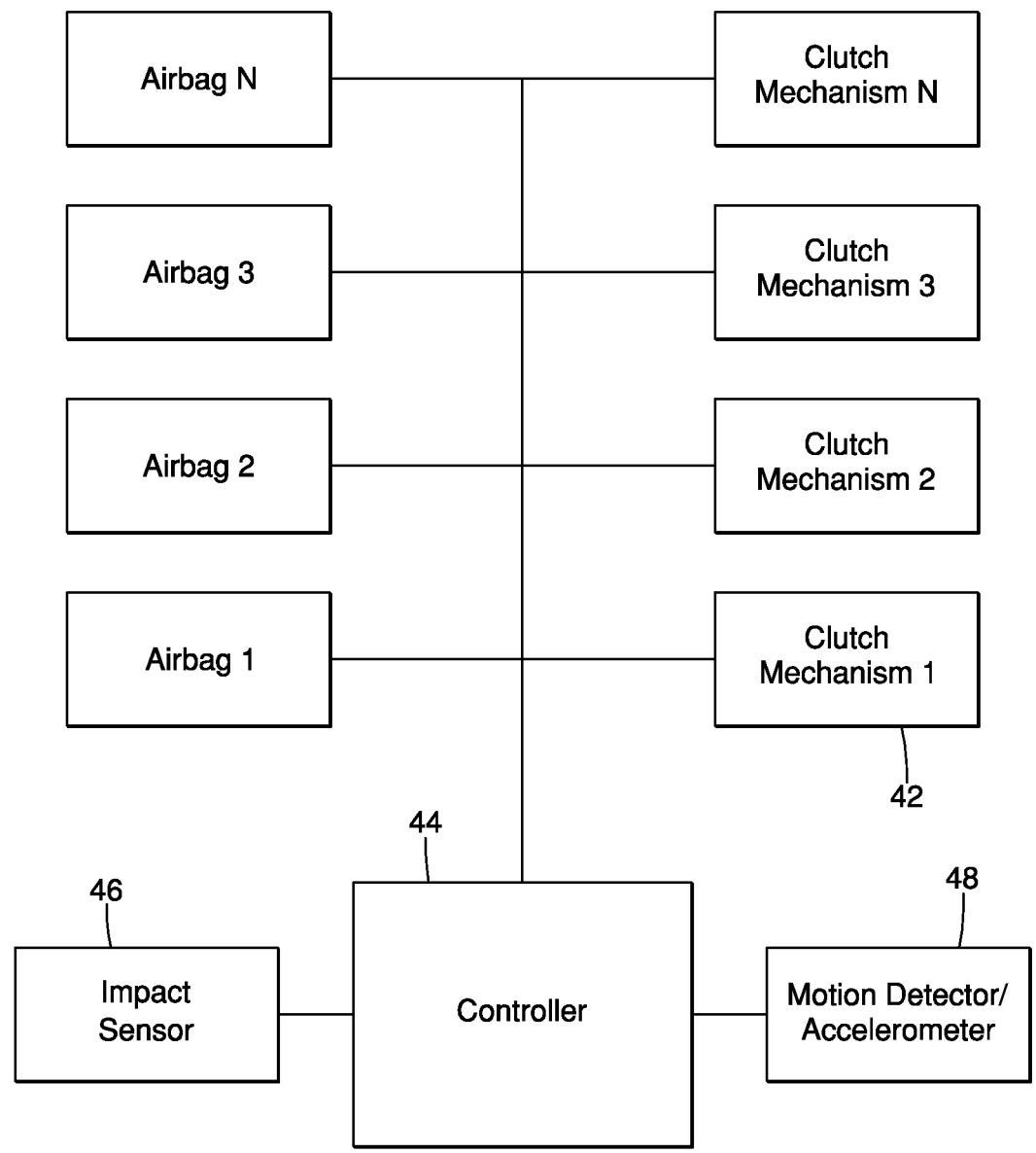
FIG. 13 is a block diagram showing a controller and sensor connected to the load limiter, the controller being configured to operate the clutch mechanism of the load limiter in accordance with the first embodiment.

A description of the controller 44 and its operation is now provided with specific reference to FIG. 13. The controller 44 is connected to the clutch mechanism 42 (and all other clutch mechanisms of other seatbelt assemblies), to airbags 1-N, an impact sensor 46 (or impact sensors) and a motion detector or accelerometer sensor 48. The controller 44 is configured to operate the clutch mechanism 42 to change from dis-engaged state to the engaged state upon initial detection of a tensioning event, and after a predetermined period of time, for example anywhere from 100 ms to 1 second, the controller 44 operates the clutch mechanism 42 to change from the engaged state to the dis-engaged state.

Tensioning events can be any one of the following: a rapid deceleration of the vehicle body structure 16, a hard-braking event or an impact event. A rapid deceleration of the vehicle body structure 16 can occur when the vehicle engages deep water (greater than two or three inches of water). A hard-braking event occurs when a vehicle operator applies a hard braking force to the brake pedal (not shown) of the vehicle 10 for a prolonged period of time (more that 1-2 seconds). An impact event is an event where the vehicle 10 impact another vehicle, or a fixed barrier. The various tensioning events cause the vehicle 10 to rapidly decrease speed (velocity) thereby causing a rapid deceleration detected by the motion detector or accelerometer sensor 48, or during an impact event, signals from the impact sensor or sensors 46. The rapid deceleration can last for several seconds, or only an instant. Regardless, the controller 44 can be configured to engage the clutch mechanism 42 briefly and then release the clutch mechanism 42 so that the buckle mechanism 42 can move against the force of the biasing members 54 thereby allowing the shoulder portion 30d of the seatbelt 30 to increase slightly in length. The change in length of the shoulder portion 30d of the seatbelt 30 allows the torso and shoulder areas of a passenger to move forward slightly, reducing the force felt by the passenger by the seatbelt 30. The initial engagement of the clutch mechanism 42 restricts initial movement of the passenger absorbing energy associated with forward momentum, and thereafter the dis-engagement of the clutch mechanism 42 relieves some the forces acting between the seatbelt 30 on the torso and shoulder areas of the passenger during rapid deceleration of the vehicle 10.

When the clutch mechanism 42 is initially engaged by the controller 44 as shown in FIG. 10, the clutch mechanism 42 retains the second member 38 in the at rest position (also referred to as the first orientation) relative to the first member 36. Thereafter, when the controller 44 dis-engages the clutch mechanism 42 as shown in FIGS. 11 and 12, the second member 38 can move to any one of the plurality of released positions, cushioned by the force of the biasing members 54.

It should be understood from the drawings and the description herein that the controller 44 can deploy the airbags depicted in FIG. 13, depending upon the circumstances detected during the tensioning event. For example, if the tensioning event is an impact event, activated ones of the airbags can be deployed. However, if the tensioning event is a hard-braking event or a rapid deceleration event in the absence of an impact event, the controller 44 can only operate the clutch mechanism 42, as described above.

Second Embodiment

Figure 14:
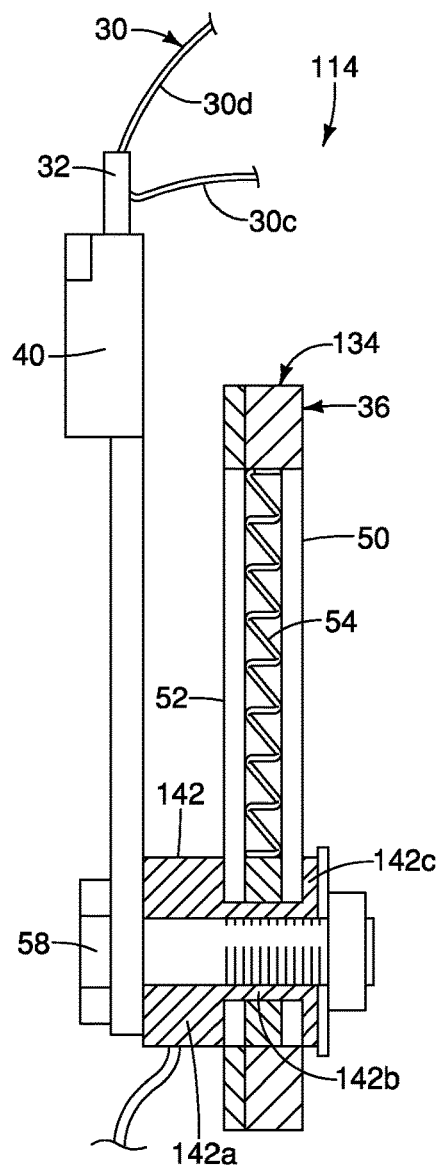
FIG. 14 is a cross-sectional view similar to FIG. 7 showing a load limiter with a clutch mechanism that extends around the pivot pin with the load limiter in an at rest state in accordance with a second embodiment.
Figure 15:
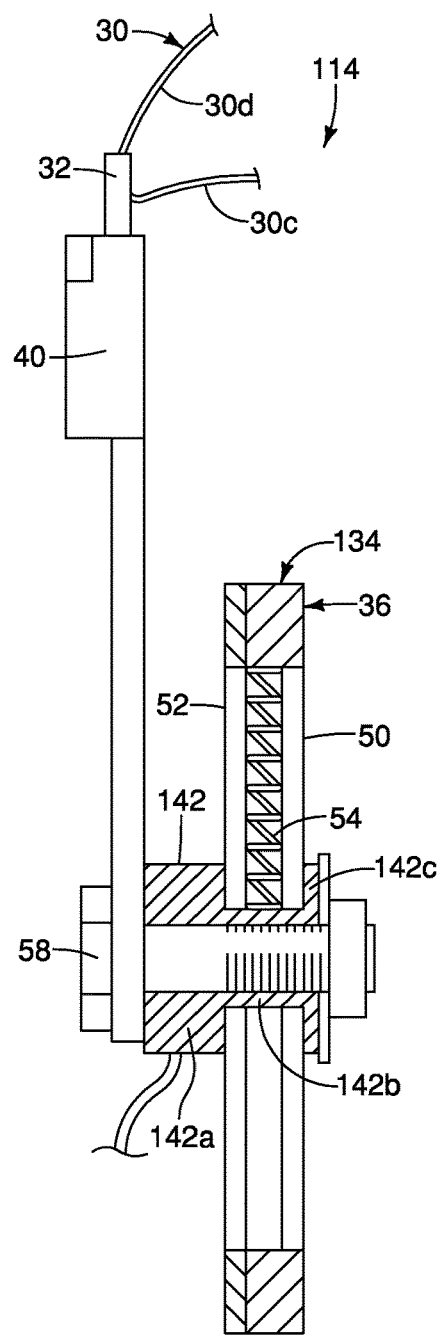
FIG. 15 is another cross-sectional view similar to FIG. 14 showing the load limiter in one of the released positions in accordance with the second embodiment.

Referring now to FIGS. 14 and 15, a seatbelt assembly 114 that includes a load limiter 134 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The load limiter 134 of the second embodiment includes many of the features of the load limiter 34 of the first embodiment, including, the first member 36 with its housing 50, the cover 52, the biasing members 54, the second member 38, the buckle mechanism 40 and the pivot pin 58. However, in the second embodiment, a clutch mechanism 142 replaces the clutch mechanism 42. In the second embodiment, the clutch mechanism 142 includes a main portion 142a, a cylindrical portion 142b and a secondary portion 142c. The main portion 142a, the cylindrical portion 142b and the secondary portion 142c are formed as a single element or assembly and are filled with the magnetorheological fluid, as with the first embodiment. The main portion 142a is disposed between the buckle mechanism 40 and the housing 50 of the first member 36. The cylindrical portion 142b surrounds the pivot pin 58 and includes an opening that the pivot pin 58 extends through. The secondary portion 142c is located between the housing 50 and a nut that secures the pivot pin 58 in place. When the clutch mechanism 142 is in an engaged state, all portions of the clutch mechanism 142 increase in size, clamping the pivot pin 58 in place relative to the housing 50. When the clutch mechanism 142 is in a dis-engaged state, the buckle mechanism, the second member 38 and the pivot pin 58 can slide relative to the first member 36 against the biasing force of the biasing members 54.

Third Embodiment

Figure 16:
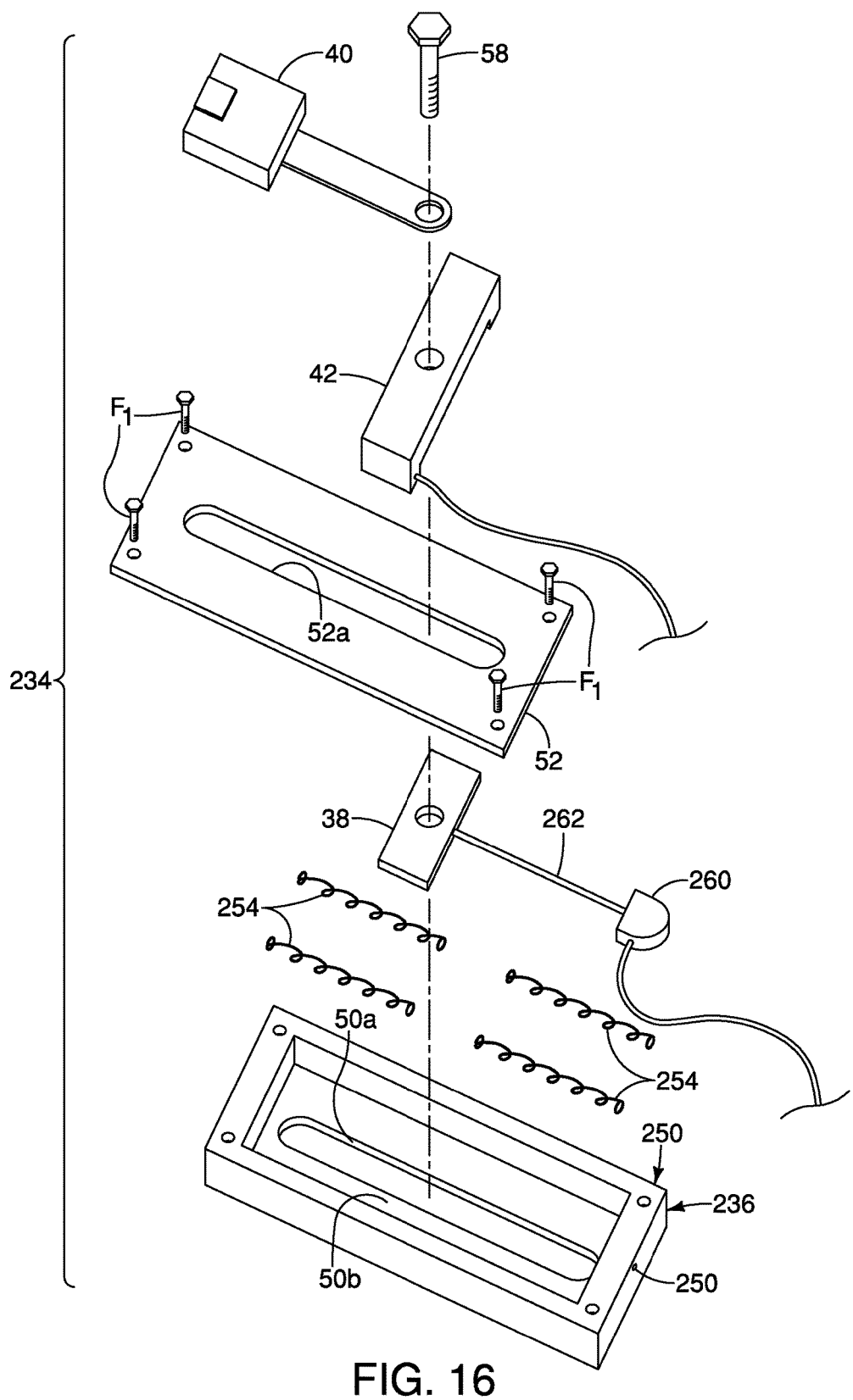
FIG. 16 is a schematic exploded perspective view of a load limiter showing details the first member, the second member, the buckle mechanism, the clutch mechanism and a position adjusting mechanism of the load limiter in accordance with a third embodiment.
Figure 17:
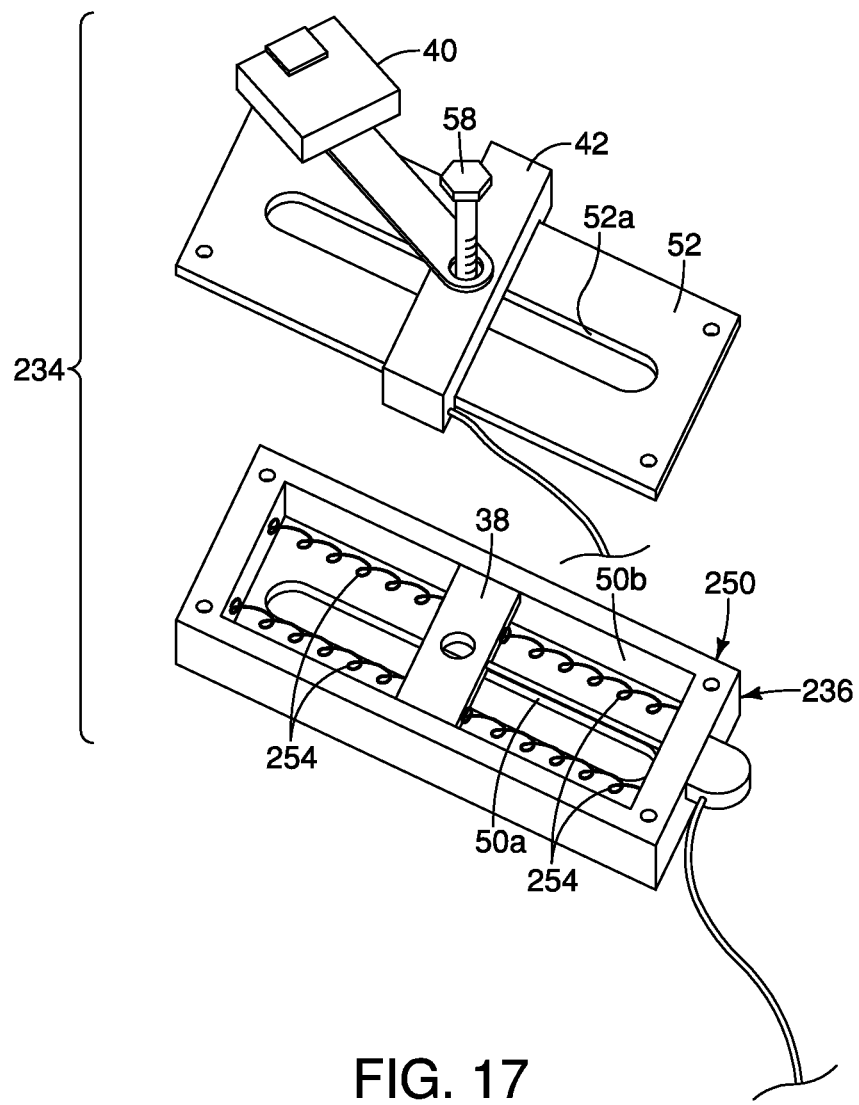
FIG. 17 is a partial exploded perspective view of the load limiter depicted in FIG. 16 shown partially assembled in accordance with the third embodiment.

Referring now to FIGS. 16 and 17, a seatbelt assembly 214 that includes a load limiter 234 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The load limiter 234 of the third embodiment includes many of the features of the load limiter 34 of the first embodiment, including, the cover 52, the second member 38, the buckle mechanism 40, the clutch mechanism 42 and the pivot pin 58. However, in the third embodiment, the first member 36 and housing 50 have been replaced with a first member 236 and housing 250. Further, the two biasing members 54 have been replaced with four biasing members 254. Two of the biasing members 254 are installed within the housing 250 at a first side of the second member 38, and two of the biasing members 254 are installed at a second side of the second member 38. Further, a position adjusting mechanism having a motor 260 and a connecting cable 262 is connected to the motor 260 and the second member 38.

In the third embodiment, the second member 38 is biased by the four biasing members 254 to an at rest position that is centrally located within the recessed portion 50b of the housing 250, as shown in both FIGS. 16 and 17. The motor 260 of the position adjusting mechanism is operated to adjust the at rest position of the second member 38 and the buckle mechanism 40 for the comfort of the passenger. Specifically, the motor 260 applies force to the connecting cable 262 pulling on it to change the at rest position of the second member 38 relative to the housing 50. When the controller 44 is provided with signals from one or both of the sensors 46 and 48 indicating a tensioning event, the motor 260 releases any tension applied to the cable 262 allowing the clutch mechanism 42 to be operated in the manner described above with respect to the first embodiment.

Fourth Embodiment

Figure 18:
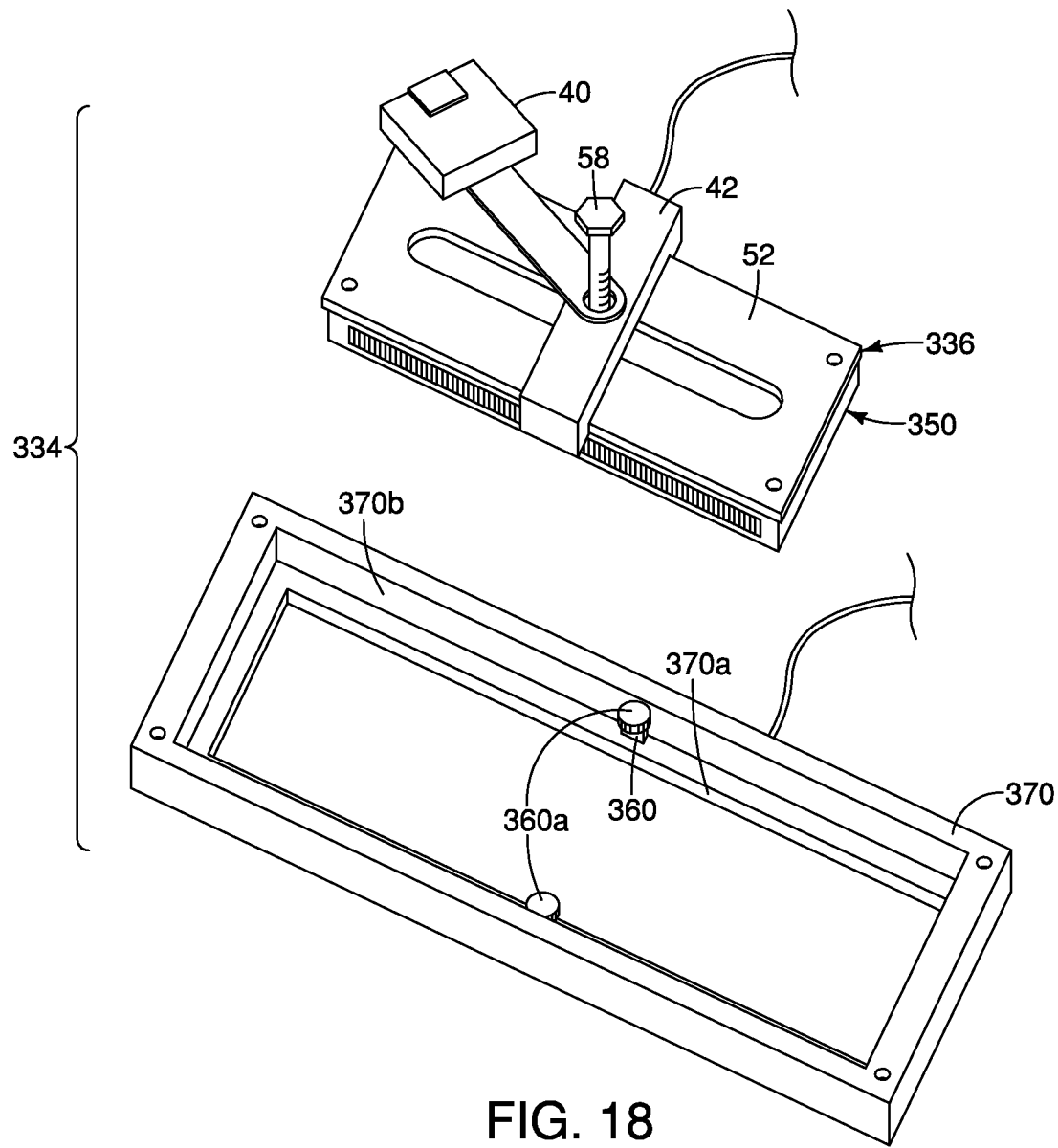
FIG. 18 is a schematic exploded perspective view of a load limiter showing details the first member, the second member, the buckle mechanism, the clutch mechanism and a position adjusting mechanism of the load limiter in accordance with a fourth embodiment.
Figure 19:
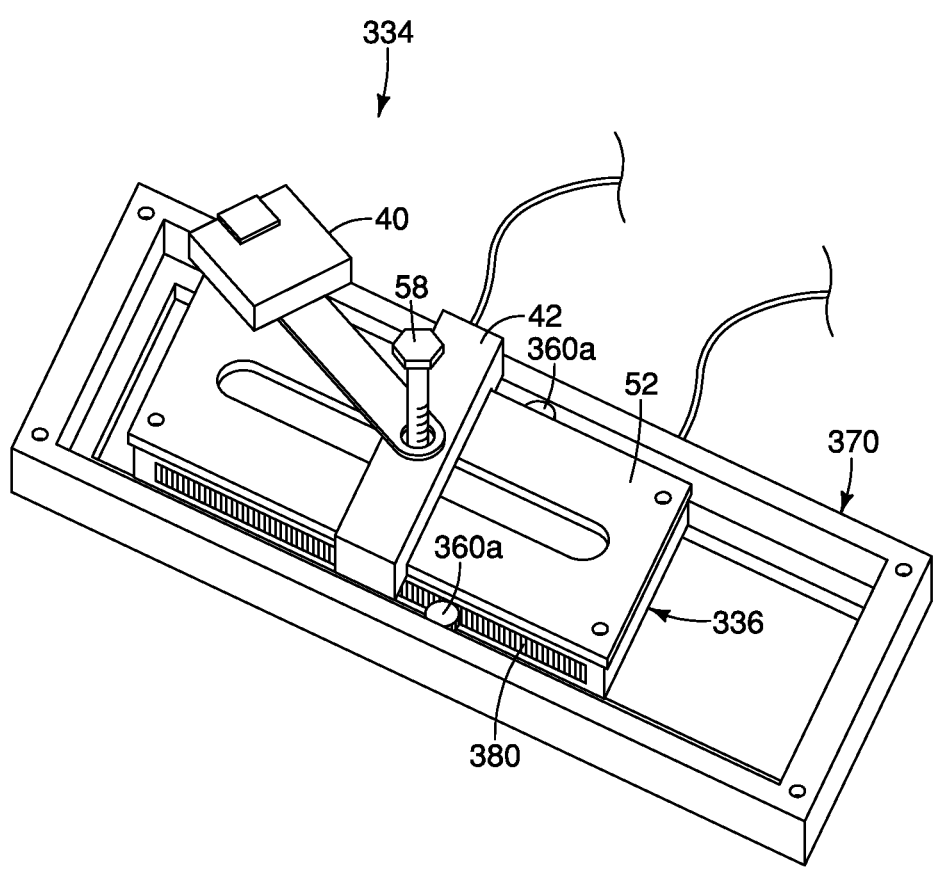
FIG. 19 is a partial exploded perspective view of the load limiter depicted in FIG. 18 shown partially assembled in accordance with the fourth embodiment.

Referring now to FIGS. 18 and 19, a seatbelt assembly 314 that includes a load limiter 334 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The load limiter 334 of the fourth embodiment includes many of the features of the load limiter 34 of the first embodiment, including, the cover 52, the second member 38 (not shown in FIGS. 18 and 19), the buckle mechanism 40, the clutch mechanism 42 and the pivot pin 58. However, in the fourth embodiment, the first member 36 has been replaced with a first member 336 that is identical to the first member 36, except that outer side surfaces thereof are provided with gear teeth 380. Further, the load limiter 334 includes a secondary housing 370 that includes a slot 370a and a recessed area 370b that is dimensioned to receive the first member 336 and a positioning mechanism that includes motors 360 (only one motor is shown in FIG. 18) and gears 360a, as shown in FIG. 19.

The secondary housing 370 is configured to be fixedly attached to the seat structure 26 instead of the first member 336. In other words, the first member 336 is movable within the secondary housing 370, while the secondary housing 370 is fixed to the seat structure 26.

The motor 360 of the position adjusting mechanism is operated to adjust the position of the first member 336 relative to the secondary housing 370 and hence the buckle mechanism 40 for the comfort of the passenger. Specifically, the motors 360 rotate the gears 360a causing the first member 336 to move within the recessed area 370b of the secondary housing 370. When the controller 44 is provided with signals from one or both of the sensors 46 and 48 indicating a tensioning event, the motor 360 does not need to be released as the released positions possible for the movement of the buckle mechanism 40 remain as described with respect to the first embodiment.

The controller 44 is configured to operate the electronic motor 260 of the third embodiment and the electronic motors 360 of the fourth embodiment in response to position related inputs made by the passenger to position the buckle mechanism 40 to a comfortable location relative to the seat structure 26.

The controller 44 preferably includes a microcomputer with a load limiter and airbag control program that controls the operation of the clutch mechanisms and airbags described above. The controller 44 can also include other conventional components such as an input interface circuit, an output interface circuit, and storage devices such as a ROM (Read Only Memory) device and a RAM (Random Access Memory) device. The microcomputer of the controller 44 is programmed to control the clutch mechanisms and airbags. The memory circuit stores processing results and control programs such as ones for load limiter and airbag operation that are run by the processor circuit. The controller 44 is operatively coupled to the load limiter, the positioning mechanisms and the airbags in a conventional manner. The internal RAM of the controller 44 stores statuses of operational flags and various control data. It will be apparent to those skilled in the art from this disclosure that the precise structure and algorithms for the controller 44 can be any combination of hardware and software that will carry out the functions of the present invention.

The various vehicle structures of the vehicle 10 are conventional components that are well known in the art. Since vehicle structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle seatbelt assembly. Accordingly, these terms, as utilized to describe the present invention should be interpreted relative to a vehicle equipped with the vehicle seatbelt assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle seatbelt assembly comprising:
   a first member configured to attach to one of a vehicle floor structure and a seat structure;
   a second member supported on the first member, the second member being configured for limited sliding movement relative to the first member;
   a buckle mechanism attached to the second member for movement therewith, the buckle mechanism having a latch device configured to releaseably retain a seatbelt latch tongue member; and
   a clutch mechanism disposed between the first member and the second member, the clutch mechanism being operable to switch between a dis-engaged state allowing movement of the second member relative to the first member and an engaged state preventing movement of the second member relative to the first member.

2. The vehicle seatbelt assembly according to claim 1, wherein
   the clutch mechanism includes a magnetorheological fluid that is electronically activated such that with an electric current being provided to the clutch mechanism, the clutch is in the engaged state, and in the absence of an electric current being provided to the clutch mechanism the clutch is in the dis-engaged state.

3. The vehicle seatbelt assembly according to claim 1, wherein
   the second member is spring biased to move toward a first orientation relative to the first member, and
   the clutch mechanism is configured to retain the second member in the first orientation relative to the first member.

4. The vehicle seatbelt assembly according to claim 1, further comprising:
   an electronic controller connected to the clutch mechanism, the controller being configured to operate the clutch mechanism to change from the engaged state to the dis-engaged state in response to detection of a tensioning event.

5. The vehicle seatbelt assembly according to claim 4, wherein
   the tensioning event is one of the following: a rapid deceleration of the vehicle body structure, a hard-braking event and an impact event.

6. The vehicle seatbelt assembly according to claim 4, wherein the buckle mechanism is attached to the second member via a coupling member such that the buckle mechanism is a first distance away from the first member by a predetermined distance with the clutch mechanism in the engaged state, and in response to the controller operating the clutch mechanism to change from the engaged state to the dis-engaged state movement of the second member relative to the first member changes the location of the buckle mechanism such that with the clutch mechanism in the dis-engaged state the buckle mechanism is a second distance away from the first member, the second distance being greater than a first distance.

7. A vehicle seatbelt assembly comprising:
a seat structure configured to install within a passenger compartment of a vehicle;
a first member attached to one of a surface of the passenger compartment and the seat structure;
a second member supported on the first member, the second member being configured for limited sliding movement relative to the first member;
a buckle mechanism attached to the second member for movement therewith and having a latch device;
a seatbelt having a first end non-movably fixed relative to seat structure and a second end retractably retained within the passenger compartment,
a seatbelt latch tongue member installed to the seatbelt and being configured to releasably attach to the latch device of the buckle mechanism; and
a clutch mechanism disposed between the first member and the second member, the clutch mechanism being operable to switch between a dis-engaged state allowing movement of the second member relative to the first member and an engaged state preventing movement of the second member relative to the first member.

8. The vehicle seatbelt assembly according to claim 7, wherein
the clutch mechanism includes a magnetorheological fluid that is electronically activated such that with an electric current being provided to the clutch mechanism, the clutch is in the engaged state, and in the absence of an electric current being provided to the clutch mechanism the clutch is in the dis-engaged state.

9. The vehicle seatbelt assembly according to claim 7, wherein
the second member is spring biased to move toward an at rest position relative to the first member, and
the clutch mechanism is configured to retain the second member in the at rest position relative to the first member.

10. The vehicle seatbelt assembly according to claim 7, further comprising:
an electronic controller connected to the clutch mechanism, the controller being configured to operate the clutch mechanism to change from the engaged state to the dis-engaged state in response to detection of a tensioning event.

11. The vehicle seatbelt assembly according to claim 10, wherein
the tensioning event is one of the following: a rapid deceleration of the vehicle body structure, a hard-braking event and an impact event.

12. The vehicle seatbelt assembly according to claim 10, wherein
the buckle mechanism is attached to the second member via a coupling member such that the buckle mechanism is a first distance away from the first member by a predetermined distance with the clutch mechanism in the engaged state, and
in response to the controller operating the clutch mechanism to change from the engaged state to the dis-engaged state movement of the second member relative to the first member changes the location of the buckle mechanism such that with the clutch mechanism in the dis-engaged state the buckle mechanism is a second distance away from the first member, the second distance being greater than a first distance.

13. The vehicle seatbelt assembly according to claim 10, wherein
the first member includes a positioning mechanism configured to adjust an at rest position of the second member relative to the first member; and
the clutch mechanism is configured to retain the second member in the at rest position.

14. The vehicle seatbelt assembly according to claim 13, wherein
the positioning mechanism includes an electronic motor connected to the controller, and
the controller is configured to operate the electronic motor during adjustment of the second member to the at rest position.

15. The vehicle seatbelt assembly according to claim 14, wherein
the controller is configured to operate the electronic motor to release the second member such that the second member can move with respect to the first member in response to the controller operating the clutch mechanism to change from the engaged state to the dis-engaged state.

* * * * *